(12) United States Patent
Risi

(10) Patent No.: US 7,637,558 B2
(45) Date of Patent: Dec. 29, 2009

(54) SYSTEM AND METHOD FOR PROVIDING REINFORCEMENT AND/OR MOISTURE PROTECTION AT DISCRETE LOCATIONS ON A WOODEN CARGO-CARRYING FLOOR

(75) Inventor: Benoit Risi, Ste-Foy (CA)

(73) Assignee: Société en Commandite Prolam, Cap St-Ignace (CA)

( * ) Notice: Subject to any disclaimer, the term of this patent is extended or adjusted under 35 U.S.C. 154(b) by 339 days.

(21) Appl. No.: 11/271,105

(22) Filed: Nov. 10, 2005

(65) Prior Publication Data

US 2006/0101754 A1  May 18, 2006

Related U.S. Application Data

(60) Provisional application No. 60/626,931, filed on Nov. 12, 2004.

(51) Int. Cl.
*B32B 3/00* (2006.01)

(52) U.S. Cl. .................... 296/184.1; 410/121; 410/156; 296/193.07

(58) Field of Classification Search ................ 410/121, 410/155, 156; 296/184.1, 187.08, 193.07; 52/506.01, 515, 568; 428/54, 55, 511, 33
See application file for complete search history.

(56) References Cited

U.S. PATENT DOCUMENTS

| | | | |
|---|---|---|---|
| 3,941,904 A | 3/1976 | Hoh et al. | |
| 4,190,686 A | 2/1980 | Muis | |
| 4,323,615 A | 4/1982 | Sauder | |
| 4,496,613 A | 1/1985 | Zagefka | |
| 5,187,000 A | 2/1993 | Chow et al. | |
| 5,198,481 A | 3/1993 | Cope | |
| 5,207,172 A | 5/1993 | Wolter | |
| 5,273,787 A | 12/1993 | Gnatowski | |
| 5,336,304 A | 8/1994 | Andoe | |
| 5,380,131 A | 1/1995 | Crawford | |
| 5,719,239 A | 2/1998 | Mirous et al. | |
| 5,985,397 A | 11/1999 | Witt et al. | |
| 6,077,610 A | 6/2000 | Correll et al. | |
| 6,124,393 A | 9/2000 | Haraguchi et al. | |
| 6,558,766 B2 * | 5/2003 | Padmanabhan et al. | |
| 7,189,041 B1 * | 3/2007 | Powell | ........................ 410/52 |

* cited by examiner

*Primary Examiner*—Stephen Gordon
(74) *Attorney, Agent, or Firm*—Merchant & Gould P.C.

(57) ABSTRACT

The present invention concerns a system and method for providing reinforcement in the form of strength and/or moisture protection at discrete locations along the bottom of a wooden cargo-carrying floor, which reduces the cost associated with such manufacture and provides at least equal if not better results. The cargo-carrying floor surface reinforcing system for a cargo-carrying body, such as transport vehicle or transport container, comprises a flooring section and at least one region having a predetermined area smaller than an area of said bottom surface of said flooring section. The flooring section is comprised of a plurality of wood boards having a top surface, a bottom surface, first and second side surfaces arranged side by side, the boards in turn being comprised of strips of wood joined end-to-end and side-to-side. The at least one region is selectively located along the bottom surface of the flooring section and is comprised of material chosen either for its structural strength properties or its water protection.

20 Claims, 6 Drawing Sheets

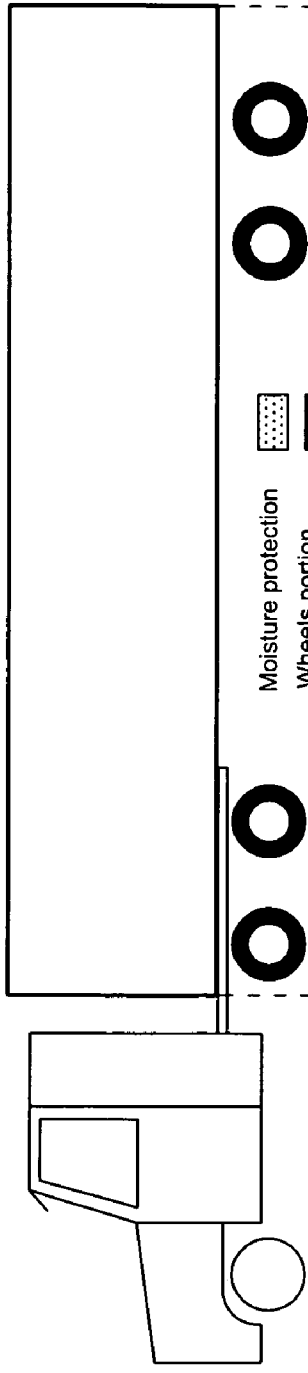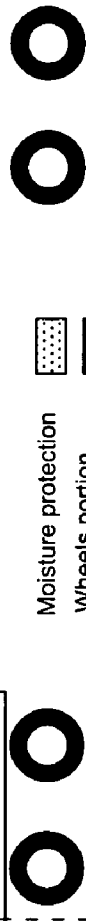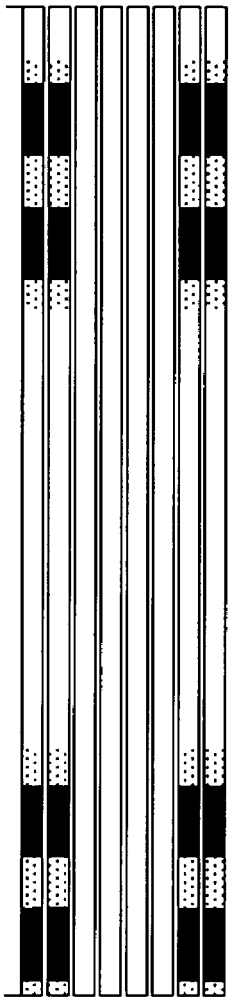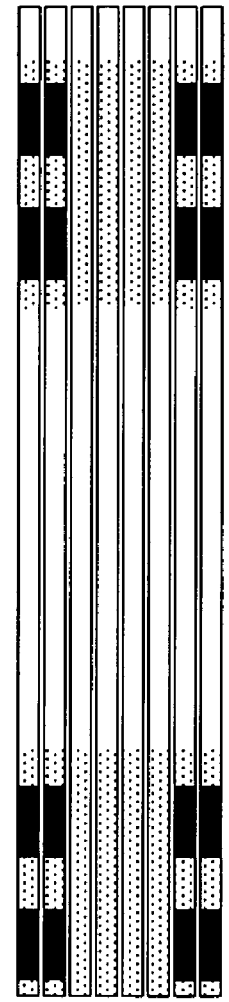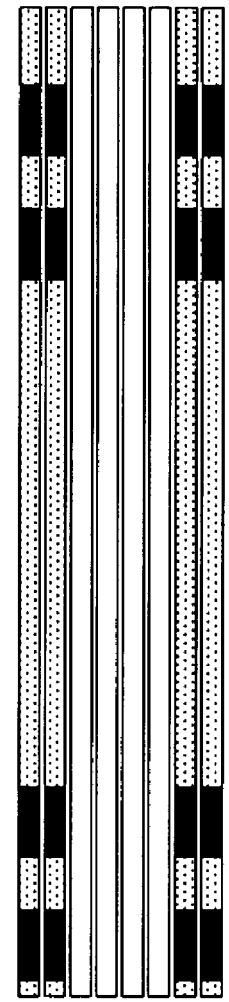
Figure 1a: Side view of a truck with a trailer
Moisture protection
Wheels portion underneath the floor
Figure 1b: Bottom view of the trailer floor
Figure 1c: Bottom view of the trailer floor
Figure 1d: Bottom view of the trailer floor

Figure 2a: Bottom view of the trailer floor

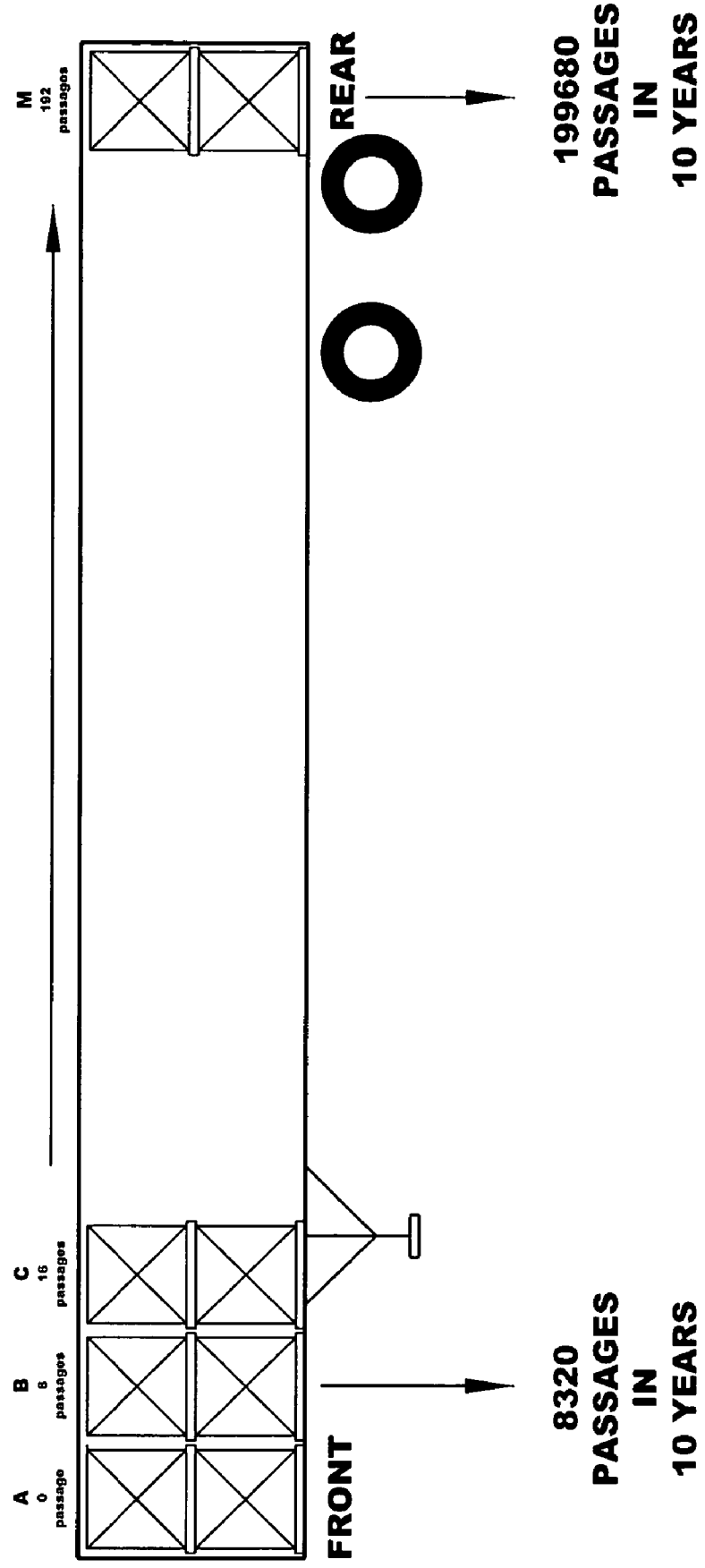
Figure 3: Side view of a trailer

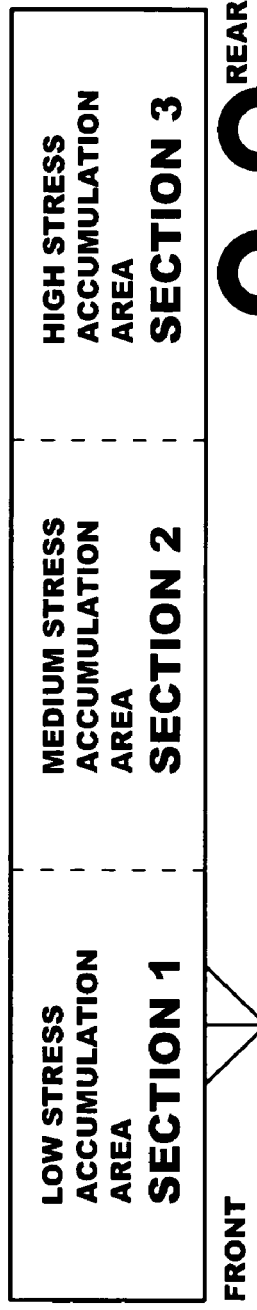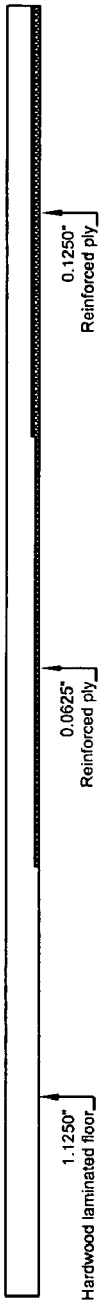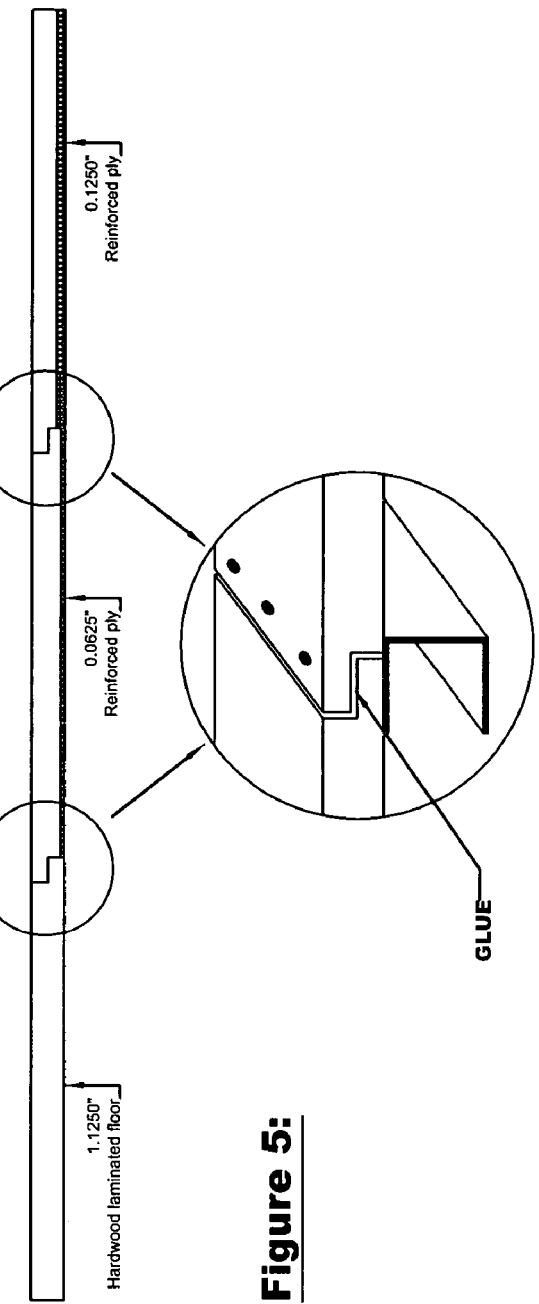

Figure 6a: Side view of a trailer floor
Figure 6b: Side view of a trailer floor Bottom view of the trailer floor

SYSTEM AND METHOD FOR PROVIDING REINFORCEMENT AND/OR MOISTURE PROTECTION AT DISCRETE LOCATIONS ON A WOODEN CARGO-CARRYING FLOOR

FIELD OF THE INVENTION

The present invention relates to a system and method for providing reinforcement and/or moisture protection at discrete locations on a wooden cargo-carrying floor of a cargo-carrying body.

BACKGROUND OF THE INVENTION

In the past decade and still today, the research and development effort for new products in the manufacturing industry of conventional laminated hardwood floor are mainly focused on the development of a floor using composite material which will increase the durability, the strength and the moisture protection of the cargo-carrying trailer/container floor. The weight of the new composite floor should, at minimum, have the same weight or preferably have less weight. Furthermore, all of the objectives should be reached at the lowest manufacturing cost.

Solutions to resolve these problems have been proposed by many in this field, and more recently by Padmanabhan U.S. Pat. No. 5,928,735 and Tunis U.S. Pat. No. 6,601,357.

Padmanabhan applies a reinforced thermoplastic ply to the entire bottom of the floor. Because reinforced ply increases the strength and stiffness of the trailer floor, the hardwood portion of the floor can be thinner. The result is a stronger and lighter trailer floor. The reinforced ply provides also a water impervious layer protecting the entire bottom part of the floor from moisture coming from the road.

Tunis provides a solution for moisture protection only. The thermoplastic ply is not reinforced and has as its sole purpose the protection of the floor from the attack of water spray and moisture over time. The thermoplastic ply covers the entire bottom surface of the floor.

The above-mentioned patents implicitly appear to be based on the same assumption: the entire area of the laminated hardwood cargo-carrying floors is exposed equally over the time to the same accumulation of the effects of stress and/or moisture attack. Based on that assumption, all the proposed solutions taught in the above-mentioned patents require necessarily that the remedy needs to be applied to the entire surface of the bottom part of the laminated hardwood floor. Furthermore, the reinforced and/or impervious moisture ply has the same thickness or the same degree of reinforcement or moisture protection all over the bottom floor.

In reality, different sections of the laminated hardwood cargo-carrying floor are not subject to the same accumulation effect of stress or exposition of moisture over time.

SUMMARY OF THE INVENTION

The present invention is directed to a system and method for providing reinforcement strength or moisture protection at discrete locations on a wooden cargo-carrying floor of a cargo-carrying body such as that of either a transport vehicle or a transport container, which reduces the cost associated with such manufacture, and provides at least equal if not better results.

A cargo-carrying floor surface reinforcing system for a cargo-carrying body comprising:

a. a cargo-carrying flooring section having a longitudinal length and lateral width, said flooring section comprising:
  i. a plurality of wood boards extending longitudinally up to a length substantially equal to the longitudinal length of said flooring section, each board having a top surface, a bottom surface opposite said top surface, and a first and second side surfaces extending between said top surface and said bottom surface, where said board has a width that is less than the lateral width of said floor, each board being formed by a plurality of wood strips arranged end-to-end and side-to-side to one another by shaped coupling portions; and
  ii. said plurality of boards being arranged side by side such that at least one of said first and said second side surfaces of each of said boards faces one of said second or first side surfaces of adjacent boards to form a floor substrate, a joint region being formed at locations at which said first side surface faces said second side surface of adjacent boards;
  wherein said flooring section has a top surface, a bottom surface opposite said top surface, first and second longitudinal side surfaces extending between said top surface and said bottom surface, a front side extending between said first and second sides, a back side opposite to said front side, a center area between said front and back sides, a center board area between said first and second sides extending longitudinally from said front side to said back side and an outer board area extending out from said center board area to either said first or second sides; and
b. at least one region of said bottom surface of said flooring section having a predetermined area smaller than a total area of said bottom surface of said flooring section, said at least one region being covered with a material that is different from wood.

BRIEF DESCRIPTION OF THE FIGURES

The following description of the invention will be better understood by reading the following text in conjunction with the accompanying drawings, in which:

FIG. 1a) is a side view of a truck with a trailer, which side view will be useful for making reference to most of the Figures following.

FIG. 1b) is a bottom view of a cargo-carrying flooring section showing four regions on the bottom surface of the flooring section which provide moisture protection at locations along the outer board areas proximate trailer wheel positions.

FIG. 1c) is a bottom view of a cargo-carrying flooring section showing two large regions on the bottom surface of the flooring section providing moisture protection to the extensive areas proximate the front and back sides of the flooring section and showing the location of trailer wheels in relation to the flooring section.

FIG. 1d) is a bottom view of a cargo-carrying flooring section of a trailer showing two long regions on the bottom surface of the flooring section providing water protection along the two outer board areas extending longitudinally from the front side to the back side of the flooring section and showing the location of trailer wheels in relation to the flooring section.

FIG. 2a) is a bottom view of a cargo-carrying flooring section showing a region of ply laminated onto wood extending longitudinally from the front side to the back side of the flooring section along the center board area providing strength protection, showing the location of trailer wheels in relation to the flooring section.

FIG. 3 is a side view of a trailer showing an estimate of the number of passages across the top surface of the cargo-carrying flooring section over a ten-year period as a function of longitudinal position along the flooring section, the number of passages being substantially greater at the back of the trailer.

FIG. 4a) is a side view of a trailer showing three areas along the flooring section: a low stress accumulation area, a medium stress accumulation area and a high stress accumulation area, which Figure will also be useful when making reference to FIG. 6.

FIG. 4b) is a side view of a cargo-carrying body showing an area proximate the front side of the flooring section which is not reinforced, a center area reinforced with a thin ply and an area proximate the back side of the flooring section reinforced with a thicker ply. In this case, the cargo-carrying body is made of continuous sections, and the thickness of the cargo carrying body is reduced by an amount equivalent to that of the thickness of the ply, resulting in an overall thickness for the cargo-carrying body that is even.

FIG. 4c) is a similar view as FIG. 4c, but where the flooring sections are made from end-to-end boards, and therefore discontinuous.

FIG. 5 is an expanded perspective view of the coupling between end to end boards comprising the cargo-carrying flooring section of FIG. 4c).

FIG. 6a) is a side view of a cargo-carrying body showing three areas along the cargo-carrying flooring section: an area proximate the front side of the flooring section which is not reinforced, a center area reinforced with a thin ply and an area proximate the back side of the flooring section reinforced with a ply of equal or greater thickness than that of the center area. All three areas are not of the same total thickness—this results in an uneven bottom surface of the flooring section.

FIG. 6b) is a side view of a cargo-carrying body where the cargo-carrying body has a thickness at the front and a thickness at the back, providing a wedge-shaped cargo-carrying body, but where the reinforced ply has an even thickness.

DESCRIPTION OF A PREFERRED EMBODIMENT OF THE INVENTION

Figures 2B, 2C:
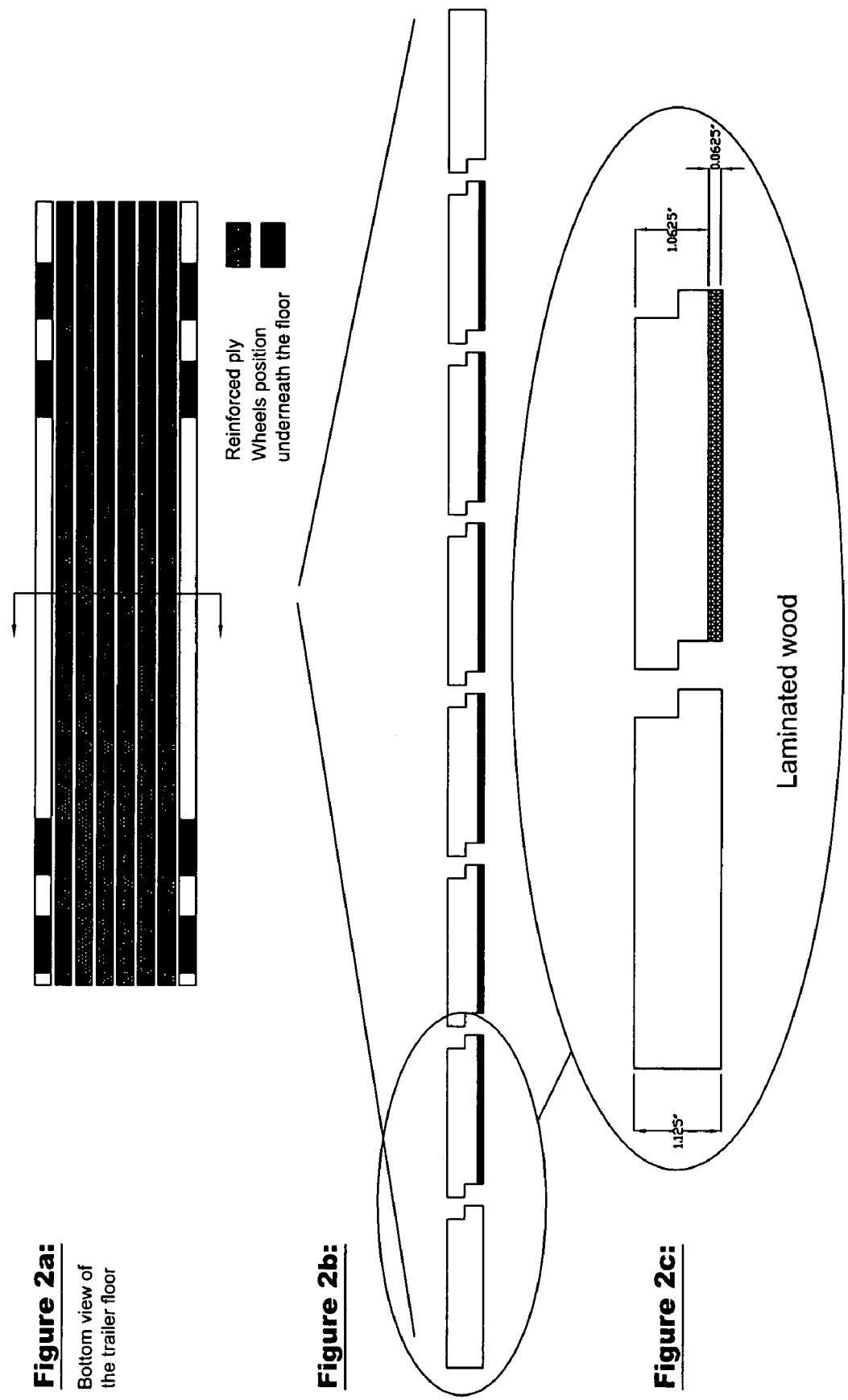
FIG. 2b) is an expanded lateral cross-sectional view of the flooring section illustrating the evenness of the flooring section at the joint between laminated wood board and typical wood board and FIG. 2c) is an exploded view of a portion thereof.

As mentioned in the Summary of the Invention and making reference to FIGS. 1-7, the present invention is directed to a hardwood cargo-carrying floor of a cargo-carrying body, such as that of either a transport vehicle or a transport container, whose bottom surface is selectively reinforced at discrete locations, but not on the whole of the bottom surface or whose bottom surface is selectively protected from moisture at discrete locations; and whose bottom surface in some locations may be protected with a traditional undercoat.

FIGS. 1a) and 4a) are side views of a trailer with a truck which will be useful for understanding the descriptions of the present invention. FIG. 1a) shows a side view of a truck with a trailer, showing schematically the location of the wheels along a cargo-carrying body. FIG. 4a) is a side view of a trailer showing how different sections of the cargo-carrying body are exposed to different levels of stress.

In order to describe the advantages of the present invention, a discussion of the history of exposure to the elements and stress of a hardwood cargo-carrying floor of a cargo-carrying trailer follows.

Stress Exposure

The front part of the floor has less passages of a lift truck than the rear or back (in the context of the present invention, the words "rear" and "back" are used interchangeably.) In North America, most trailers or containers are loaded from the rear to the front, exposing the rear to more passages of a forklift. In fact, the first 4 feet of the floor will almost never support the stress of the passage of the forklift comparatively of the last 4 feet where the number of passage will be 10 to 12 times more than the front. It can also be observed that the middle area of the laminated hardwood floor will support more passage than the outer area along the wall. The consequence is that the middle area at the rear of the floor suffers more damage than any other region of the floor. In fact, trailer manufacturers put more cross members at the rear instead of the front. Also, sometimes, a threshold plate can be installed on top of the first foot of the rear floor section to help to protect the floor from frequent passages of the forklift.

Moisture Exposure

Exposure to moisture coming from the road damages cargo-carrying (trailer/container) floors. Different regions of the floor incur different degrees of water damage. In reality, the bottom part of the floor at the rear or/and above the wheels is exposed to a great deal more direct and intensive water spray than any other area of the trailer.

Assuming that the effect of the stress and/or the moisture attack does not have the same impact on different areas of the laminated hardwood floor, the present invention offers a novel method for the application of reinforcement and/or moisture protection which reduces cost and offers superior protection and reinforcement.

Thus, the present invention teaches the application of reinforcement at discrete locations, and teaches the application of moisture protection at other discrete locations. This new philosophy to resolve the problem related to reinforcement and/or moisture protection of a laminated hardwood floor will create a variety of designs that will use several combinations of reinforcements and/or impervious moisture protection on the bottom of the laminated hardwood floor. These new innovative designs, which will maximize the use of a reinforced and/or moisture protection ply at the appropriate area on the bottom of the laminated hardwood floors, will reduce the total cost of manufacturing. These designs will have a significant economic advantage compared to the solution offered in the past. Economically speaking, it does not make sense to reinforce and/or protect from moisture the entirety of the bottom of a floor with the same type of reinforcement having the same strength and stiffness and/of having the same moisture protection durability.

Thus, the purpose of the invention is to offer a more economic product optimizing the design using reinforced and/or moisture protection layers having appropriate levels of reinforcement and/or moisture protection on the bottom of the trailer floors. Several combinations of reinforcement and moisture protection are thus now available.

The following is a non-exhaustive description of preferred embodiments of the invention, through some examples.

EXAMPLE 1

In rainy conditions, the parts of trailer that receive the greater exposure to moisture are above the wheels of the truck and the trailer itself. Intensive water spray and sand of rock coming from the wheels diminishes drastically the durability of a traditional under coat. In practice, after two years, the undercoat is literally washed-out from the bottom of the floor. One solution would be to glue (PUR, Epoxy, etc.) a plastic ply (or any other material), or to apply other materials such as tar or a resin, having a strong abrasive resistance onto the bottom surface of the floor but only along the regions above the wheels of the truck and the trailer itself. FIGS. 1b), 1c) and 1d) show the entire bottom of the trailer floor where moisture protection could be necessary. In FIG. 1b), only the area proximate the wheels is protected. In FIG. 1c), larger zones of the floor bottom are protected, but still limited to the vicinity of the wheels. In FIG. 1d), the moisture protection is applied along each side of the trailer only but not in the middle. The other areas of the floor bottom are protected with a conventional water based undercoat.

EXAMPLE 2

A trailer floor is usually composed of eight boards having a width of about one foot. The boards along the outside wall are called outer boards and the six boards in the middle are called center boards. The outer boards, because they are along the wall, suffer less from the passage of the forklift compared to the center boards. When the forklift goes in and out of the trailer, it travels mainly in the middle of the trailer. Even when a pallet is placed along the trailer wall, the wheels of the forklift do not go completely over the outer boards along the wall. Modern forklifts are equipped with side shifts to prevent the forklift from hitting and damaging the wall of the trailer. FIG. 2a) shows the bottom of a trailer floor where only the centre boards are reinforced. Usually, a trailer floor is 1.313 inches thick. In the new design, the outer boards are 1.0625 inches or 1.125 inches thick of laminated hardwood floor without reinforcement. The floor is thinner because as stated before the outer boards accumulate less stress by the passage of the forklift compared to the center boards. The centre boards have the same thickness as the outer boards but they are now a composite floor. For example, the center boards are laminated hardwood boards of 1 inch thickness reinforced with a 0.0625 or 0.125 inches thick composite material. The composite material could be fibreglass, fibre carbon or any other material that can be used to reinforce wood. The cost of applying a reinforced ply only to those regions of the cargo-carrying floor where it is useful is about 25% less than the cost of applying a continuous reinforcing or impervious ply along the entire bottom surface of the cargo-carrying floor, and is thus economically and commercially advantageous. FIGS. 2b) and 2c) show how the flooring sections are assembled.

EXAMPLE 3

As previously mentioned, the rear of a trailer supports more passages of a forklift than any other part of a trailer floor. FIG. 3 shows a 53-foot long 8-foot high and 8-foot wide trailer, which is common in the art. In such a trailer it is possible to load 52 pallets of 64 cubic feet each (4 feet×4 feet×4 feet). Let us examine what is happening when a forklift starts to load the trailer from the rear. The first four feet at the front of the trailer floor will almost never bear the weight of the forklift. The second four feet, section B in FIG. 3, will experience at least 8 passages of the forklift (in and out for the first pallet put at the front of section A). Section C, which is the third four-foot section at the front of the trailer, will undergo twice as many passages as section B so 16 passages. If we continue this reasoning, the last four feet at the rear of the trailer after the trailer has been loaded will undergo 96 passages. So in one loading and unloading cycle, section B of the floor has undergone 16 passages while section M has undergone 192 passages. Supposing that a trailer makes 2 deliveries per week, 52 weeks per year, and the life expectancy of a trailer is about 10 years, section B of the floor will have undergone 16 640 passages while section M will have undergone 199 680 passages. Considering this information, it would be more appropriate to reinforce the floor according to where reinforcement is required. An appropriate design could be distinguishing two or more regions of the wooden cargo-carrying flooring section, for example, distinguishing 3 regions of a trailer floor: the front, the middle and the rear, as shown in FIG. 4a). The front region (section 1) of the wooden trailer floor, because it supports less passages of the forklift, does not need to be reinforced. The thickness of the laminated floor could be 1.313 inches like it is in a conventional laminated hardwood floor, but can also be thinner as demonstrated here. We are assuming here that a thickness of 1.125 inches is enough to support the stress on the floor in that section/region. The middle region (section 2) of the cargo-carrying floor will be provided with a reinforced laminated hardwood floor having a thickness of 1.125 inches. The wood part could be 1.0625 inches thick with a reinforced ply of 0.0625 inches thick for a total of 1.125 inches. The rear region (section 3) of the cargo-carrying floor, which requires a greater stress-bearing capacity, would be provided with a composite floor having a wood part of 1 inch thick and a reinforced ply of 0.125 inches thick.

FIG. 4b) shows such an arrangement, where the floor is continuous, front to back.

As shown in FIG. 4c), the floor may be discontinuous, and thus the sections need to be coupled together. This configuration eases manufacturing, since the sections of varying thickness can be directly manufactured, without having to remove excess wood once the whole length has been manufactured, as in FIG. 4b). The coupling of section 1 to section 2 and the coupling of section 2 to section 3 will preferably occur at the top of a cross member. The design of the coupling could be a single end-to-end board coupling or a more sophisticated coupling having a tongue and groove or/and shiplap style. Use of the shiplap style with PUR glue in the joint (see FIG. 5) is more appropriate because of the way the floor is screwed to the cross member. The shiplap style will insure that both sections of the floor are tight up against the cross member.

The end result is a floor having the same thickness everywhere, but with three regions of varying strength and stiffness: a front region with minimum strength and stiffness, a middle region with intermediate strength and stiffness, and a rear region with maximum strength and stiffness. In this case, the cost is almost 35 to 45% less than the case where a continuous reinforced impervious layer is applied over the entire bottom surface of the cargo-carrying flooring section.

Examples 2 and 3 can be combined in a way such that the outer board and the front area of the flooring section are not reinforced. The cost of this option would be approximately less than half of the cost of applying a continuous reinforced impervious layer is over the entire bottom surface of the cargo-carrying flooring section.

EXAMPLE 4

In example 3, the different combinations of the thickness of the laminated hardwood floor and of the reinforced ply have the same total thickness, making the overall thickness of the floor all the same. End users and trailer manufacturers, where the floor is discontinuous, dislike having transversal joints between sections for several reasons. One reason is that the transversal joint can create problems with the forks of the forklift. The forklift can hit the joint and rap up the surface of the floor. For this reason, an end user may prefer to have a continuous even top surface, a surface contained within a single plane, over the entire length of the trailer but a bottom surface that is not even, viz. does not lie within a single plane. In this case (see FIG. 6a), the wooden part of the laminated trailer floor will have the same thickness, for example a 1.125 inch thickness. The first section at the front of the trailer will not have a reinforcement ply. The second section may have a reinforcement ply of a given thickness, for example a 0.0625 inch thickness, and the rear section could have a reinforcement ply of a thickness equal or greater than that of the middle section, for example a thickness of 0.0625 inch or 0.125 inch. As a consequence of this design, the bottom surface of the floor will be uneven, will not be contained within a single plane. Another option is to shape the bottom surface in a wedge, as shown in FIG. 6b), so that the difference in thickness is gradual, as opposed to be stepped as in FIG. 6a), but the layer of reinforcement is even.

When the bottom surface is uneven, the cross member will not be at the same level. This problem has been pointed out to trailer manufacturers and it appears that the difference of level on the cross member does not represent a problem. In fact, the cross member can follow the different levels of the uneven bottom floor of the floor or wedges of appropriates thickness can be placed at desired locations to compensate for the uneven floor. In both cases the top surface of the floor will be in level making the floor parallel with the roof of the trailer.

In order to overcome a stability issue, wedges of appropriate thickness can be placed at desired locations to minimize the effects of an uneven floor, particularly at the front and at the centre.

EXAMPLE 5

Figure 7:
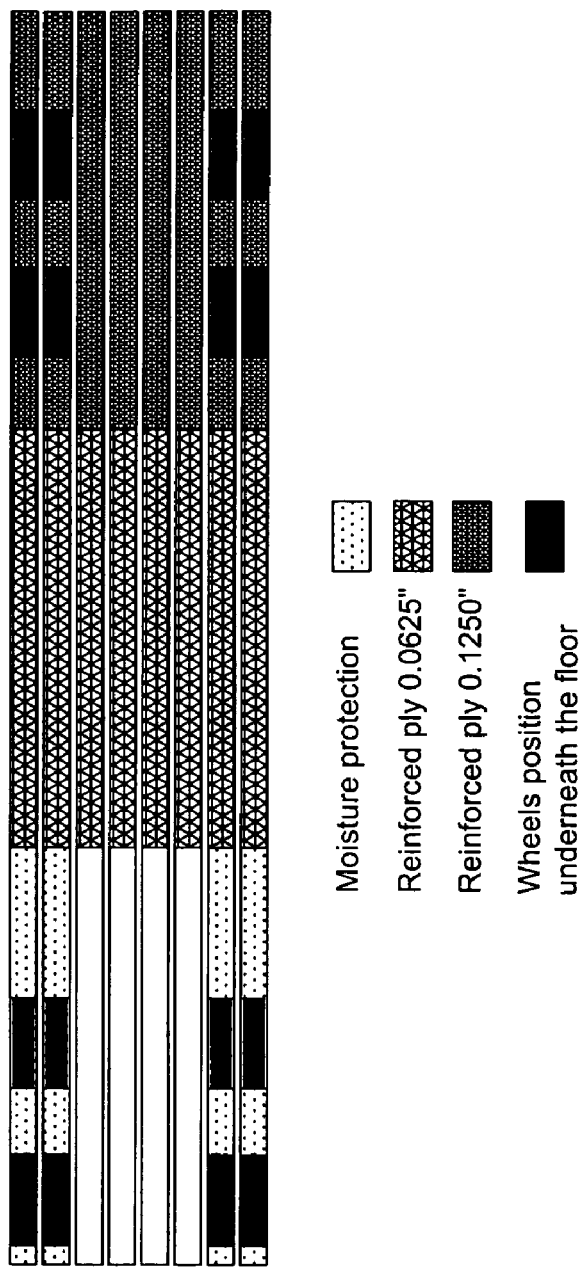
FIG. 7 is a top view of a cargo-carrying body showing regions of varying type and degree of protection (strength of water protection, reinforced ply thickness) comprising almost 80% of the bottom surface of the flooring section.

Another design would be to take a floor as designed in examples 2, 3 and 4 and add a ply of moisture protection where protection is needed. A reinforced ply usually has the characteristic of being impervious to water. As such we do not need to double up on the protection by applying a moisture protection ply onto the reinforced ply. Moisture protection ply is necessary only where wood is exposed to excessive water spray: above the wheel. FIG. 7 shows an example of this design. In this design, almost 80% of the bottom surface of the trailer is either reinforced or protected from moisture. However, the cost of this design is still lower than the cost of a solution where a continuous reinforced impervious layer is applied over the entire bottom surface of the cargo-carrying floor.

The previous examples have clearly shown all the possibilities which are now available when changing the basic assumption: over time, all parts of the floor are not subject to the same accumulation effect of stress and moisture attack. From this, it makes more sense economically to reinforce and protect only those regions of the floor that need reinforcement or protection. A composite floor having reinforced ply and/or moisture protection only where it is needed will be as good as a composite floor having reinforced ply and/or moisture protection everywhere but will cost less. This cost advantage will be a strong and important one upon commercialization of the product.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A cargo-carrying floor surface system for a cargo-carrying body comprising:
   a. a cargo-carrying flooring having a longitudinal length and lateral width, said floor comprising:
      a plurality of wood boards extending longitudinally up to a length substantially equal to the longitudinal length of said floor, each board having a top surface, a bottom surface opposite said top surface, and first and second side surfaces extending between said top surface and said bottom surface, wherein each of said wood boards has a width that is less than the lateral width of said floor, each of said wood boards being formed by a plurality of wood strips arranged end-to-end and side-to-side to one another by shaped coupling portions; said plurality of boards being arranged side by side and joined together at adjacent side surfaces to form said floor,
      wherein said floor has a top, a bottom opposite said top, first and second sides, a front, a back opposite to said front, a center area between said front and back, a center board area between said first and second sides and an outer board area extending out from said center board area to either said first or second sides; and
      a plurality of cross members extending laterally underneath the plurality of wood boards and providing support to the wood boards; and
   b. at least one discrete location of said bottom of said floor being covered with a material that is different from wood, wherein said material is in addition to and distinct from said plurality of cross members, and wherein at least one of moisture protection and reinforcement properties are improved at said at least one discrete location, so that said bottom of said floor is covered with said material only at said at least one discrete location, a remainder of a total area of said bottom of said floor being uncovered by said material.

2. A floor system according to claim 1, wherein said material covers said bottom on at least two discrete regions located at different positions along said bottom.

3. A floor system according to claim 1, wherein said plurality of wood boards are hardwood boards.

4. A floor system according to claim 1, wherein at least one of said at least one discrete location is located at a position on said floor exposed to moisture, both liquid and vapor.

5. A floor system according to claim 1, wherein at least one of said at least one discrete location is located at a position on said floor located above cargo-carrying body wheels.

6. A floor system according to claim 1, wherein at least one of said at least one discrete location is located proximate to said back of said floor.

7. A floor system according to claim 1, wherein at least one of said at least one discrete location is located along said center area of said floor.

8. A floor system according to claim 1, wherein at least one of said at least one discrete location is located at said center board area of said floor.

9. A floor system according to claim 1, wherein at least one of said at least one discrete location is located at said outer board area of said floor.

10. A floor system according to claim 1, wherein at least one of said at least one discrete location comprises ply laminated to said floor.

11. A floor system according to claim 1, wherein said bottom of said floor is contained within a single plane.

12. A floor system according to claim 1, wherein said bottom of said floor is stepped.

13. A floor system according to claim 1, comprising:
  a. a first discrete location covered with a water impervious material, said first discrete location being located proximate said front of said floor along said first side above cargo-carrying body wheels;
  b. a second discrete location covered with a water impervious material, said second discrete location being located proximate said front of said floor along said second side above said cargo-carrying body wheels;
  c. a third discrete location covered with a water impervious material, said third discrete location being located proximate said back of said floor along said first side above said cargo-carrying body wheels; and
  d. a fourth discrete location covered with a water impervious material, said fourth discrete location being located proximate said back of said floor along said second side above said cargo-carrying body wheels.

14. A floor system according to claim 1, comprising:
  a. a first discrete location covered with a water impervious material extending laterally from said first side to said second side of said floor and longitudinally from said front of said floor towards said back of said floor to a position past front cargo-carrying body wheels; and
  b. a second discrete location covered with a water impervious material extending laterally from said first side to said second side of said floor and longitudinally from said back of said floor towards said front of said floor to a position past back cargo-carrying body wheels.

15. A floor system according to claim 1, comprising:
  a. a first discrete location covered with a water impervious material located at said outer board area along the length of said first side of said floor; and
  b. a second discrete location covered with a water impervious material located at said outer board area along the length of said second side of said floor.

16. A floor system according to claim 1, comprising:
  a. a first discrete location covered with a reinforcing material of a given thickness such that said bottom of said floor is contained within a single plane, said first discrete location extending laterally from said first side to said second side of said floor and longitudinally from said back of said floor towards said center area of said floor to a position past back cargo-carrying body wheels; and
  b. a second discrete location covered with a reinforcing material of a thickness less than said given thickness such that said bottom of said floor is contained within a single plane, said second discrete location extending laterally from said first side to said second side of said floor and longitudinally from said front towards said center area of said floor to a position before front cargo-carrying body wheels.

17. A floor system according to claim 16, further comprising:
  a. a third discrete location covered with a water impervious material located proximate said front of said floor at said outer board area along said first side above cargo-carrying body wheels; and
  b. a fourth discrete location covered with a water impervious material located proximate said front of said floor at said outer board area and located along said second side above cargo-carrying body wheels.

18. A floor system according to claim 1, wherein:
said bottom of said floor is stepped, further comprising:
  a. a first discrete location covered with a reinforcing material having a given thickness, said first discrete location extending laterally from said first side to said second side of said floor and longitudinally from said back of said floor towards said center area of said floor to a position past back cargo-carrying body wheels; and
  b. a second discrete location covered with a reinforcing material of a thickness less than said given thickness, said second discrete location extending laterally from said first side to said second side of said floor and longitudinally from said first discrete location towards said center area of said floor to a position before front cargo-carrying body wheels.

19. A floor system according to claim 18, further comprising:
  a. a third discrete location covered with a water impervious material located proximate said front of said floor at said outer board area along said first side above cargo-carrying body wheels; and
  b. a fourth discrete location covered with a water impervious material located proximate said front of said floor at said outer board area along said second side above cargo-carrying body wheels.

20. A floor system according to claim 1, wherein said material that is different from wood that covers each of said at least one discrete location is fixed, bonded, glued, fastened, sprayed, painted or otherwise permanently affixed to said floor.

* * * * *